Sept. 2, 1958
J. G. KNOWLES
2,849,887
TRANSMISSIONS
Filed Oct. 17, 1955
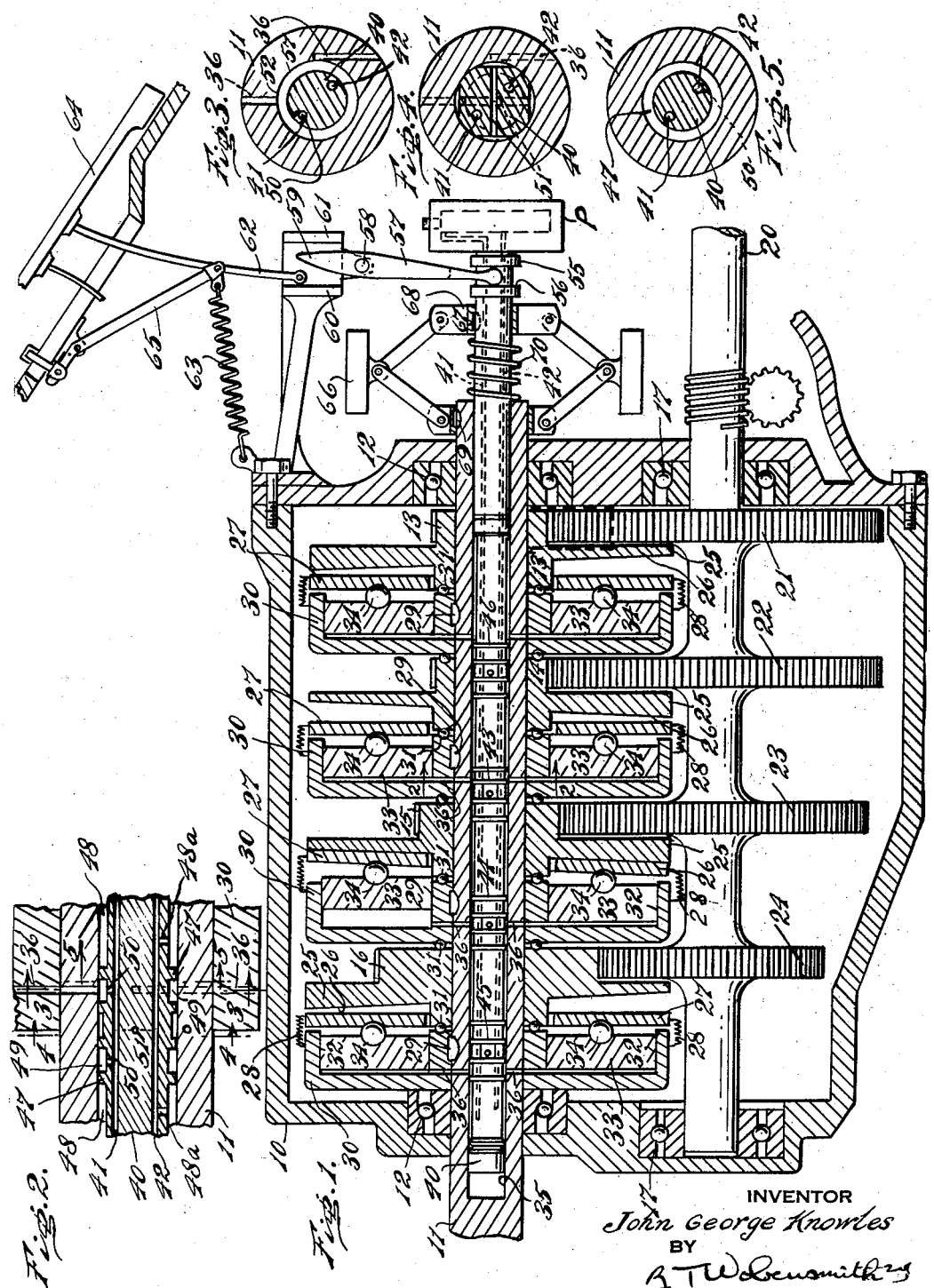
INVENTOR
John George Knowles
BY
ATTORNEY United States Patent Office 2,849,887
Patented Sept. 2, 1958

2,849,887

TRANSMISSIONS

John George Knowles, Huntingdon Valley, Pa.

Application October 17, 1955, Serial No. 540,672

14 Claims. (Cl. 74—336.5)

This invention relates to transmissions and more particularly to transmissions of the change speed type.

It is the principal object of the present invention to provide a transmission having a plurality of gear trains, one of these being selected manually or automatically as described, a fluid control being employed to effect operation with a particular train.

It is a further object of the present invention to provide a transmission in which a plurality of gear trains are interposed between a motor driven input shaft and a take-off shaft, and in which the selection of a particular train is determined by the speed of one of the shafts.

It is a further object of the present invention to provide a transmission in which the control is determined by the setting of a manual control lever and also by a speed responsive element connected to one of the shafts.

It is a further object of the present invention to provide a transmission of the character aforesaid in which a fluid control is provided, manually variable and also influenced by the speed of the output of one of the shafts.

It is a further object of the present invention to provide a transmission of the character aforesaid in which the fluid control system has fluid pressure balancing.

It is a further object of the present invention to provide a transmission of the character aforesaid which will be sturdy and reliable and free from the likelihood of operating difficulties.

Other objects of the invention will be apparent from the specification and claims.

The nature and characteristic features of the invention will be more readily understood from the following description, taken in connection with the accompanying drawings forming part hereof, in which:

Figure 1 is a longitudinal view partly in elevation and partly in section of a transmission in accordance with the invention;

Fig. 2 is a fragmentary longitudinal sectional view, enlarged, of a portion of the transmission shown in Fig. 1;

Fig. 3 is a transverse sectional view, taken approximately on the line 3—3 of Fig. 2;

Fig. 4 is a transverse sectional view taken approximately on the line 4—4 of Fig. 2; and Fig. 5 is a transverse sectional view taken approximately on the line 5—5 of Fig. 2.

It should, of course, be understood that the description and drawings herein are illustrative merely, and that various modifications and changes may be made in the structure disclosed without departing from the spirit of the invention.

Like numerals refer to like parts throughout the several views.

Referring now more particularly to the drawings, a housing 10 is provided within which a shaft 11 extends, the shaft 11 being supported in any desired manner such as by bearings 12. The shaft 11 is driven in any preferred manner, such as by a motor (not shown), which may be an internal combustion engine or the like. The shaft 11 has a plurality of gears 13, 14, 15 and 16, of different diameters rotatably mounted thereon, one for each of the gear trains desired. An idler gear 13' can also be provided, in engagement with the gear 13.

The housing 10 also has mounted therein, and suitably supported such as by bearings 17, a take-off shaft 20. Each of the gears 13', 14, 15 and 16 has a corresponding gear 21, 22, 23 and 24 in engagement therewith, the gears 21, 22, 23 and 24 being keyed to the shaft 20 for driving movement thereof.

The gear trains 13'—21, 14—22, 15—23, and 16—24, may have any desired ratios, consistent with their center distances, and merely by way of illustration the train 13—13'—21 may provide for reverse, the train 16—24 may have a one to one ratio as in the conventional "high" or "third" gear heretofore provided in conventional change speed gearing for motor vehicles. Similarly, the train 14—22 may have a ratio corresponding to "low" or "first" gear and the train 15—23 may have a ratio corresponding to "second" gear. Each of the gears 13, 14, 15 and 16 has mounted thereon in spaced longitudinal axial relation thereto and for rotary movement with respect to the shaft 11, a cam 25 with a face 26 disposed in a plane at a predetermined angle to the longitudinal axis of the shaft 11.

The shaft 11 also has keyed thereto by keys 29, for each gear train, a casing 30, with bearings 31 separating each gear and its attached cam from the casings 30. Each of the casings 30 has a plurality of cylinder bores 32 therein with their longitudinal central axes parallel to the longitudinal axis of the shaft 20. Any desired number of cylinder bores 32 can be employed, the minimum being two, and additional bores 32 will provide a more gradual action as will hereinafter appear. Each of the bores 32 has slidably mounted therein a piston 33.

The pistons 33 each have a ball 34 which engages a bearing plate 27 normally urged into engagement therewith by springs 28. The bearing plates 27 are adapted to separately engage the faces 26 of the cams 25, as hereinafter explained.

As the cylinder bores 32, pistons 33 and associated structure are substantially identical in construction and differ only in location, a description of one should suffice for the others.

The shaft 11 has an internal longitudinal bore 35 and passageways 36 extend from each of the bores 32 to the bore 35 with their terminals at the bore 35 in predetermined spaced relation.

The bore 35 has axially movable therein a control element 40. The control element 40 is provided with a pair of longitudinally extending fluid passageways 41 and 42, one of which functions as a supply passageway for the delivery of liquid under pressure from any desired source, such as a pump P or the like, and the other of which functions as a return passageway, for the return of liquid to the pump P.

The control element 40 is provided at predetermined spaced locations, and so as to be effective successively for the gear trains 14—22, 15—23 and 16—24, and selectively for the gear train 13—13'—21, with control portions 43, 44, 45 and 46.

Each of the control portions 43, 44, 45 and 46 is similarly constructed and it will accordingly not be necessary to describe them all in detail. For purposes of illustration reference can be had to Fig. 2 where the control portion 43 is shown.

Each of the control portions 43, 44, 45 and 46 has spaced cylindrical ring portions 47, with a peripheral face width in excess of the longitudinal dimensions of the terminal ports of the passageways 36, and annular grooves 49 from which a port 50 extends in communication with the supply passageway 41. Outwardly beyond and between each of the ring portions 47, cutaway portions 48 are provided each of which has a port 48a communicating with the return passageway 42. This structure permits supplying fluid for filling and permits throttling as well as sealing off selected passageways 36, in either direction of movement, as determined by the positioning of the control element 40.

The grooves 49 in each cylindrical portion are spaced apart at any desired distance but preferably a distance greater than twice the longitudinal dimensions of the terminal ports of the passageways 36 to permit throttling and sealing off selected passageways 36 and sufficient to accommodate spaced bridging passageways 51 which do not communicate with each other, and which are not connected to either the supply passageway 41 or the return passageway 42, but which terminate in flat dead end cutaway portions 52 at central sections 53, for balancing of the forces on the control element 40. (See Figs. 3 and 4.)

While any desired number of cylinder bores 32 may be employed for each gear train, when two bores 32 are employed, as shown in Fig. 1, the equalization of the pressure is more important.

In order to position the control element 40 at the desired location on its longitudinal axis, a collar 55 is provided thereon having a recess 56 within which the ends of a bifurcated lever 57 are mounted. The lever 57 is supported on a fulcrum pin 58 and has a pointed end 59 adapted to move between abutments 60 and 61. An actuating lever 62, normally urged by a spring 63 to a position with its end terminus in engagement with the abutment 60 is positioned by an actuating arm 64 which may be the accelerator pedal of the motor which drives the shaft 11. The lever 62 is adapted to be shifted by a setting lever 65 from the position shown where for normal operation it can engage the left side of the end 59, to a position for engagement with the right side of the end 59 for reverse operation.

While the control element 40 may be positioned manually, if desired, it is preferred to provide a speed responsive device 66 which may be of the fly ball type, rotatable with the control element 40 and being connected to a collar 68 by a key 67 and by a key 69 to the shaft 11. A spring 70 may be provided interposed between the collar 67 and the end of the shaft 11.

The mode of operation will now be pointed out.

Assuming that rotation of the shaft 11 is initiated, each of the casings 30 is also rotated. At the outset, the control element 40 is in a neutral position with the control portions 43, 44, 45 and 46 at intermediate or out of active relation with respect to the passageways 36.

Fluid under pressure in the supply passageway 41 is sealed therein while at the same time all the passageways 36 are connected through the cutaway portions 48 to the return passageway 42.

Each of the gears 13, 14, 15 and 16 is free from any driving connection with respect to the shaft 11.

If now, the actuating arm 62 is moved to bring its terminal portion against the end 59, upon further advancing movement the lever 57 is moved about its fulcrum pin 58 to move the control element 40 inwardly.

As the control element 40 is moved inwardly, the first effect is the temporary closing of the passageways 36 for the gear train 14—22 by the appropriate ring portion 47 which then moves to a position so that fluid from the groove 49 is supplied through the passageways 36 to the cylinder bores 32.

The rate of admission or building up of pressure is determined by the area of groove 49 brought into communication with the passageways 36. As fluid under pressure is admitted to the bores 32 and against the pistons 33, the ball connections 34 of the pistons 33 urge the bearing plate 27 into engagement with the cam 25. Rotation of the gear 14 tends to rotate the cam 25 and the bearing plate 27. Movement of the bearing plate 27 by the cam 25 against the ball connections 34 tends to pump fluid from the cylinder bore 32 to which the nearest or highest part of the plate 26 is contiguous, through the passageway 36 and the groove 49 to the other bore 32. The gear 22 is not under these conditions locked to the shaft 11 so as to drive the shaft 20.

Upon further movement inwardly of the control element 40, and with the pistons in their outward position, the passageways 36 are sealed off so that fluid cannot be discharged from the bores 32. The pistons 33 are thus positioned so that the bearing plate 27 engages the cam 25 and provides a gripping so that the rotation of the gear 22 is transmitted to the shaft 20.

Rotation of the shaft 20 is effective on the speed responsive device 66, and further inward movement of the arm 62 is likewise effective for moving the control element 40 inwardly so that first a reversal of the pressure fluid application is effected for the pistons 33 and bores 32 for the gear train 14—22 and the control portion 44 is brought into action in the manner previously described to bring the gear train 15—23 into action.

In a similar manner the gear train 16—24 is also brought into action.

If at any time the arm 64 is retracted or permitted to retract, and dependent upon the position of the control element 40, there will be a backward movement towards the condition initially described and to the extent determined by the degree of retraction of the arm 64.

If drive in reverse is desired, the setting lever 65 is moved to position the end terminus of the lever 62 between the end 59 and the abutment 61. Advancing movement of the lever 62 will then effect outward movement of the control element 40 and move the control portion 43 into a position with respect to the passageways 36 of the gear train 13—13'—21, in a manner similar to that prevously described, so that the pistons 33 for that gear train can be fluid locked in their bores in engagement with the cam bearing plate 26. Upon retraction of the lever 62 and resetting of the setting lever 65, the transmission can be operated in a forward direction in the manner previously described.

I claim:

1. A variable speed transmission comprising a driving shaft and a driven shaft, groups of gears of different ratios connecting said shafts, one of the gears of each of said groups being secured to one of said shafts for rotation therewith, the other of the gears of each group having a cam member connected thereto, a housing for each group of gears secured to the other of said shafts and having a plurality of cylinder bores therein, piston members in each of said cylinder bores having portions connected thereto for engagement with said cam member, passageways in said housings extending from each of said cylinder bores to predetermined locations, and a control member for controlling the movement of pressure fluid between said cylinder bores.

2. A variable speed transmission as defined in claim 1 in which a speed responsive member driven with said other shaft is connected to said control member for positioning said control member.

3. A variable speed transmission as defined in claim 1 in which one of the groups of gears has a reversing idler interposed therein.

4. A variable speed transmission as defined in claim 1 in which a manually operable member is provided for controlling the positioning of said control member, and a speed responsive member driven with said other shaft is connected to said control member for controlling the positioning of said control member.

5. A variable speed transmission comprising a driving shaft and a driven shaft, groups of gears of different ratios connecting said shafts, one of the gears of each of said groups being secured to one of said shafts for rotation therewith, the other of the gears of each group having a cam member on the side face thereof, a housing for each pair of gears secured to the other of said shafts and having a plurality of cylinder bores therein parallel to the longitudinal axis of said shaft, pistons in each of said cylinder bores having portions connected thereto for engagement with said cam member, said other shaft having a bore therein, passageways extending from each of said cylinder bores to predetermined locations in said shaft bore, and a control member in said shaft bore, said control member having a supply fluid passageway connected to a source of fluid under pressure and a return fluid passageway, said control member having portions for cutting off communication with said housing passageway, portions for connecting said housing passageways for each housing to said supply fluid passageway, and portions for connecting said housing passageways to said return fluid passageway.

6. A variable speed transmission as defined in claim 5 in which a speed responsive member driven with said other shaft is connected to said control member for controlling the positioning of said control member.

7. A variable speed transmission as defined in claim 5 in which a manually operable member is provided for controlling the positioning of said control member, and a speed responsive member driven with said other shaft is connected to said control member for controlling the positioning of said control member.

8. A variable speed transmission comprising an input shaft and an output shaft, groups of gears of different ratios connecting said shafts, one of the gears of each of said groups being secured to said output shaft for rotation therewith, the other of the gears of each group having a cam member on the side face thereof, a housing for each pair of gears secured to said input shaft and having a plurality of cylinder bores therein parallel to the longitudinal axis of said shaft, pistons in each of said cylinder bores having portions connected thereto for engagement with said cam member, said input shaft having a bore therein, passageways extending from each of said cylinder bores to predetermined locations in said shaft bore, and a control member in said shaft bore having a supply fluid passageway connected to a source of fluid under pressure and a return fluid passageway for controlling the supplying of pressure fluid to and exhaust from said housing passageways.

9. A variable speed transmission as defined in claim 8 in which a speed responsive member driven with said input shaft is connected to said control member for controlling the positioning of said control member.

10. A variable speed transmission as defined in claim 8 in which one of the groups of gears has a reversing idler interposed therebetween.

11. A variable speed transmission as defined in claim 8 in which a manually operable member is provided for controlling the positioning of said control member, and a speed responsive member driven with said input shaft is connected to said control member for controlling the positioning of said control member.

12. A variable speed transmission comprising an input shaft and an output shaft, groups of gears of different ratios connecting said shafts, one of the gears of each of said groups being secured to said output shaft for rotation therewith, the other of the gears of each group having a cam member on the side face thereof, a housing for each pair of gears secured to said input shaft and having a plurality of cylinder bores therein parallel to the longitudinal axis of said shaft, pistons in each of said cylinder bores having portions connected thereto for engagement with said cam member, said input shaft having a bore therein, passageways extending from each of said cylinder bores to predetermined locations in said shaft bore, and a control member in said shaft bore, said control member having a supply fluid passageway connected to a source of fluid under pressure and a return fluid passageway, said control member having portions for cutting off communication with said housing passageway, portions for connecting said housing passageways for each housing to said supply fluid passageway, and portions for connecting said housing passageways to said return fluid passageway.

13. A variable speed transmission as defined in claim 12 in which a speed responsive member driven with said input shaft is connected to said control member for controlling the positioning of said control member.

14. A variable speed transmission as defined in claim 12 in which a manually operable member is provided for controlling the positioning of said control member, and a speed responsive member driven with said input shaft is connected to said control member for controlling the positioning of said control member.

References Cited in the file of this patent

UNITED STATES PATENTS

| | | |
|---|---|---|
| 963,092 | Sundh | July 5, 1910 |
| 1,199,640 | Vincent | Sept. 26, 1916 |
| 2,075,404 | Nika | Mar. 30, 1937 |
| 2,170,538 | Sarver | Aug. 22, 1939 |